US007423070B2

(12) United States Patent
Larsson et al.

(10) Patent No.: US 7,423,070 B2
(45) Date of Patent: Sep. 9, 2008

(54) SURFACE-MODIFIED BASE MATRICES

(75) Inventors: Anders Larsson, Uppsala (SE); Ulrika Meyer, Uppsala (SE); Kajsa Stridsberg Fridén, Uppsala (SE); Eva Von Heijne, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 430 days.

(21) Appl. No.: 10/517,293

(22) PCT Filed: Jun. 18, 2003

(86) PCT No.: PCT/SE03/01035

§ 371 (c)(1),
(2), (4) Date: Dec. 7, 2004

(87) PCT Pub. No.: WO2004/003542

PCT Pub. Date: Jan. 8, 2004

(65) Prior Publication Data

US 2005/0222279 A1 Oct. 6, 2005

(30) Foreign Application Priority Data

Jun. 28, 2002 (SE) .................................... 0202067

(51) Int. Cl.
*C08J 7/16* (2006.01)
*C08G 83/00* (2006.01)
*G01N 30/56* (2006.01)

(52) U.S. Cl. ....................... 521/138; 521/143; 521/189; 523/446; 523/447; 525/54.3; 526/238.22; 526/283.23; 502/401; 502/402

(58) Field of Classification Search ................. 521/143, 521/138, 189; 523/446, 447; 525/54.3; 526/238.22, 526/238.23; 502/401, 402
See application file for complete search history.

(56) References Cited

U.S. PATENT DOCUMENTS 3,300,474 A * 1/1967 Flodin et al. ................ 536/120
3,897,414 A * 7/1975 Albertsson ............... 536/25.41
4,411,832 A 10/1983 Cuatrecasas et al.

FOREIGN PATENT DOCUMENTS

DE 196 21 741 12/1997
WO WO 96/31549 10/1996

OTHER PUBLICATIONS

Cherestes, A., et al., "Dendrimeric ion exchange materials", *Polymer*, vol. 35, No. 15, 1994, pp. 3343-3344.
Ling, F., et al., "Effect of Multivalency on the Performance of Enantioselective Separation Media for Chiral HPLC Prepared by Linking Multiple Selectors to a Porous Polymer Support via Aliphatic Dendrons", *J. Org. Chem*., vol. 67, 2002, pp. 1993-2002.

* cited by examiner

*Primary Examiner*—Irina S Zemel
(74) *Attorney, Agent, or Firm*—Yonggang Ji

(57) ABSTRACT

The present invention is a surface-modified base matrix comprised of a porous polymeric base matrix onto which branched hydrophilic polyhydroxy-functional polymers have been covalently attached, wherein the polyhydroxy-functional polymers are hyperbranched polymers presenting a degree of branching (DB) of at least about 0.2 and each polymer is tethered to the base matrix at two or more points. The present matrix can for example be a cross-linked carbohydrate material, such as agarose, and the hyperbranched hydrophilic polymer can e.g. be a copolymer of epichiorohydrin and a sugar. The invention also relates to a method of surface-modification of a porous base matrix by activating functional hydroxy groups thereon and contacting the activated matrix with a hydrophilic hyperbranched hydroxy-functional polymer.

16 Claims, 5 Drawing Sheets

SURFACE-MODIFIED BASE MATRICES

CROSS REFERENCE TO RELATED APPLICATIONS

This application is a filing under 35 U.S.C. § 371 and claims priority to international patent application No. PCT/SE2003/001035 filed Jun. 18, 2003, published on Jan. 8, 2004 as WO 2004/003542 and also claims priority to patent application No. 0202067-5 filed in Sweden on Jun. 28, 2002; the disclosures of which are incorporated herein by reference in their entireties.

TECHNICAL FIELD

The present invention relates to the field of isolation, and more specifically to a surface-modified base matrix, which is useful in chromatographic separation methods. The present invention also encompasses a novel surface-modified base matrix useful in ion-exchange methods. Furthermore, the present invention also relates to a method of surface-modification of a porous base matrix as well as a method of producing ion-exchangers from such a surface-modified base matrix.

BACKGROUND

Ion-exchange is a chromatographic method frequently used for isolation of compounds with ionic or ionizable groups. Different compounds can be separated from each other on the basis of their net charge. Like in all chromatographic methods, two mutually immiscible phases are brought into contact, wherein one phase is stationary and the other is mobile. Thus, a sample that comprises one or more target compounds is introduced into the mobile phase, where it undergoes a series of interactions between the stationary and the mobile phases as it is being carried through the system by the mobile phase. During the desorption or elution step, separated compounds emerge in the order of increasing interaction with the stationary phase. The least retained component elutes first, the most strongly retained material elutes last. Separation is obtained when one component is retarded sufficiently to prevent overlap with the zone of an adjacent solute as sample components elute from the column.

The stationary phase of an ion-exchanger usually comprises two components, namely a polymer matrix and functional groups coupled thereon. Such functional groups are commonly denoted ligands. The ligands are permanently bonded ionic groups that have counterions of opposite charge. These counter-ions can be exchanged for an equivalent number of other ions of the same sign in the mobile phase. Thus, in cation-exchange methods, the ligands are of negative charge, while in anion-exchange methods, the ligands are of positive charge. Proteins are normally positively charged at low pH values and negatively charged at high pH. Hence, both cation-exchange and anion-exchange techniques can be used in protein separations. In cases where negatively charged DNA is an important contaminant, e g in processing of cell homogenates, cation exchange processes are preferred in order to specifically adsorb the protein component.

Important factors in the choice of a suitable matrix for ion-exchange are, inter alia, the adsorption capacity obtained, and the selectivity and specificity of the ligands. For practical reasons, there is also a need of general matrices that can be used for example for separation of many kinds of proteins.

Coating of chromatographic base matrices with various polymers has been disclosed. Thus, U.S. Pat. No. 5,030,352 (Purdue Research Foundation) discloses a method of rendering a rigid hydrophobic polymer surface hydrophilic, which surface is useful on a chromatographic medium. More specifically, a hydrophobic surface, such as a polystyrene divinylbenzene polymer material, is exposed to a solute that adsorbs via a hydrophobic domain leaving hydrophilic domains extending from the surface. Said extending domains are subsequently cross-linked in place to produce a coating which is sufficiently hydrophilic to partially or completely mask the hydrophobic surface. The solute is defined by having short, interdispersed, hydrophilic and hydrophobic domains, and is illustrated with the two monomers epichlorohydrin and glycidol. Since the polymerisation is performed under conditions of cation polymerisation, the epichlorohydrin will act as a hydrophobic chlorine-functional comonomer and not as a cross-linker during the polymerisation. The coated polymer is described as erosion resistant, compatible with aqueous protein solutions and chemically stable at most pH values. If desired, the coating can comprise groups that can be further derivatised to produce a chromatography material, such as an ion-exchanger. However, since the coating has been adsorbed via hydrophobic/hydrophilic interactions, it will form a comparatively flat dense layer on the pore surfaces. The most satisfactory coatings were obtained with glycidol/epichlorohydrin ratios below 3, while ratios of 5-10 are stated to be less advantageous. Thus, the flat coating obtained, which is comprised of a surface of cross-linked polymer which is not covalently coupled to the support, is advantageous in the given case where the purpose of the coating is to prevent interactions between proteins and the hydrophobic pore surfaces. However, the flat dense surface will prove less advantageous for uses wherein a high diffusion rate and a high capacity are desired.

Similar to the above, U.S. Pat. No. 5,503,933 (Purdue Research Foundation) discloses hydrophilic coatings covalently bound to hydrophobic surfaces as well as methods for their production. To form the coated surfaces, a compound is provided which comprises a hydrophobic domain covalently and flexibly bonded to a hydrophilic domain, wherein the hydrophobic domain comprises an unsaturated group. Said compound is adsorbed onto the hydrophobic surface, and the unsaturated groups in its hydrophobic domains are then covalently cross-linked to the unsaturated groups on the surface by a free radical reaction. This method serves the same purpose as the above-discussed U.S. Pat. No. 5,030,352 and also gives a similarly flat, dense and also cross-linked layer. As mentioned above, this kind of layers is not the most advantageous from the diffusion point of view.

It has also been suggested to provide chromatographic matrices, wherein porous base matrices are treated with polymer in order to fill the pores with polymer. Thus, U.S. Pat. No. 5,906,747 (Biosepra Inc) discloses chromatographic media characterised by high static and dynamic sorption capacity, which are also said to exhibit improved chemical stability at alkaline and basic conditions and reduced tendencies to cause non-specific protein adsorption. This is achieved by treating a porous matrix with a passivating mixture of a main monomer, which comprises a vinyl monomer having at least one polar substituent, a passivating monomer, which comprises hydrophobic domains, e.g. a long-chain saturated hydrocarbon, an olefinic hydrocarbon group, or an aromatic group, and a cross-linker. The preferred matrices are porous mineral oxide particles. The method disclosed in U.S. Pat. No. 5,906,747 results in a composite material, wherein a polymeric gel network is confined within the pores of the matrix. The confinement of the polymeric gel network will prevent any substantial swelling of the gel, which is stated to be undesired since it "dilutes" the number of binding sites available and hence reduces its binding capacity. Still, the composite matrix disclosed allows solutes to move freely within the entire polymeric network while interacting electrostatically with more than one group present thereon. However, the use of this kind of products is limited, since many protein types do not penetrate into the hydrogel structure to the desired extent.

WO 99/64149 discloses another hydrogel product for adsorption purposes. More specifically, a support matrix, such as a protein or agarose, is coated with at least two layers of polyalkylene amine, such as polyethylene amine. Said core is subsequently removed by degradation, e.g. enzymatically or by hydrolysis. The invention is illustrated in the context of removal of undesirable metal ions from a leachate.

Another technology for pore filling of chromatographic matrices is described in U.S. Pat. No. 5,114,577 (Mitsubishi Kasei Corp.). More specifically, a composite separating agent is disclosed, which is comprised of an organic porous polymer substrate in the pores of which a hydrophilic polymer, which exhibits a giant network structure, has been deposited. The organic polymer substrate is made from a synthetic copolymer of a monounsaturated monomer, such as styrene, and a polyunsaturated monomer, such as divinylbenzene. An illustrative hydrophilic polymer is dextran, e.g. cross-linked with epichlorohydrin, which has a molecular weight Mw of about 500,000 before cross-linking. Thus, the dextran is allowed to diffuse into the porous substrate and is then cross-linked in the pore system by addition of epichlorohydrin. The resulting composite separating agent exhibits an excellent permeability of liquids and is therefore intended for use in gel permeation chromatography (GPC). The degree of cross-linking of the substrate should be 4-100% in order to provide a sufficient mechanical rigidity therefore. The resulting composite separating agent presents a macro-network structure reminiscent of the above-discussed U.S. Pat. No. 5,906,747, where the pores of the support matrix are completely filled with a hydrogel of crosslinked polysaccharide. In the GPC applications intended by U.S. Pat. No. 5,114,577, the hydrogel will prevent larger molecules from entering the macropores of the support. It is expected that if this hydrogel were to be derivatised to form an ion exchanger, it would only work for those particular proteins that partition favourably into the hydrogel.

Further, in order to provide chromatographic separation matrices with enhanced binding capacity, alternative coatings comprised of extenders that together provide a fluffier layer have been suggested. For example, WO 98/33572 (Amersham Pharmacia Biotech AB) discloses a method for adsorbing a substance from a liquid in a fluidised bed or in a stirred suspension comprised of such matrices.

An illustrative example of such a porous or fluffy layer comprised of extenders is illustrated in WO 00/75195 (Amersham Pharmacia Biotech AB), wherein a method of hydrophilisation or surface area enlargement of a porous base matrix is disclosed. More specifically, polyhydroxy polymers carrying a plurality of —$(CH_2CH_2O)_nH$ (polyethylene glycol) groups are attached to a porous base matrix, either via grafting of ethylene oxide or by coupling of an etoxylated polymer such as ethoxylated polyvinyl alcohol. Polyethylene glycol is in itself a highly linear molecule, while ethoxylated polyvinyl alcohol is characterised by a structure of a comb-like polymer, i.e. a linear core with short side chains of polyethylene glycol.

Another kind of extenders is disclosed in WO 95/13861, wherein in principle linear extenders comprised of poly(vinyl ether) are suggested.

The technique of using a fluffy layer as a coating to modify and enhance the binding capacities of chromatographic matrices has also been applied in commercial products. For example, Sepharose™ XL (Amersham Biosciences AB, Uppsala, Sweden) is a product that comprises an agarose matrix grafted with a layer of dextran to increase the availability of ion-exchange ligands coupled thereto. The dextran, which is derived from Leuconostoc mesenteroides, strain B512-F, is of medium molecular weight, such as about 40 kD, and is medium branched, meaning that about 5% of the glucose residues are branching points, giving a DB of 0.1.

Royappa: J Appl Polym Sci 65, 1897 (1997) reports an examination of boron trifluoride-catalyzed cationic copolymerisation of epichlorohydrin and glycidol with reference to the effect of various reaction variables, such as temperature and water content. The pattern of monomer consumption indicates the formation of a block or graft copolymer, with some branching and generation of small ring species. Thus, similar to the above-discussed U.S. Pat. No. 5,030,352, the resulting polymer will be a hydrophobic-hydrophilic polymer wherein chlorine remaining from epichlorohydrin is still present. It is also mentioned that the copolymers produced can be coated onto microscopic porous cross-linked poly (styrene-divinylbenzene) beads for use in chromatography. Such cross-linked beads are in their uncoated form extremely hydrophobic, but when coated with this polymer, the beads are rendered hydrophilic and water-wettable. The coating provides useful reactive groups on the bead surface, such as the hydroxyl group from the glycidol, which can be further derivatised to create different kinds of chromatographic media. However, in affinity chromatography and ion exchange, the hydrophobic parts of the polymers can still be expected to give rise to unspecific adsorption, which is usually undesired.

Further, Royappa et al (Journal of Applied Polymer Science, Vol. 82, 2290-2299 (2001): Amphiphilic Copolymers of Glycidol with Nonpolar Epoxide Comonomers) reports an investigation of copolymers of glycidol with various comonomers, such as epichlorohydrin, synthesised by cationic ring-opening polymerisation. The comonomer product consists of a hyperbranched polyglycidol core and has a low molecular weight. These products are useful as HIC coatings without need of any further purification. It is summarised that bot NMR and FTIR data are consistent with highly branched polyether chains replete with hydroxyl groups and side groups from the comonomers. However, from the spectral data, it does not appear that any of the side groups in the copolymer participates in the reaction in any way, which may prove a drawback for certain applications.

WO 96/31549 discloses a step-wise method of producing dendrimeric graft polymers. More specifically, the invention discloses dendrimeric graft polymers based on carriers containing hydroxyl groups on the surfaces of which polymers are covalently bound by an end-position monomer unit to the carrier. Hence, each structure will be tethered to the carrier at one point.

Finally, Cherestes and Engel (POLYMER Volume 35, Number 15, 1994:3343-3344) describe dendrimeric ion exchange materials. More specifically, ion exchange materials are disclosed wherein dendrimeric "balloons" or "strings" have been attached to a polymer backbone. The "ballons" are dendrimers elaborated in several directions from a core site, with one non-branching unit bound to the core. Thus, such dendrimers, also known as cascade molecules, are species incorporating elements of repetitive symmetry. The dendrimers disclosed contains multiple cationic sites incorporated covalently into a single structural unit. The materials are produced from styrene/divinylbenzene copolymer treated with a tertiary amine reagent.

In summary, in the field of chromatography, there is still a need of alternative base matrices, which after derivatisation with desired ligands can provide efficient ion-exchangers useful for efficient isolation of a larger range of various proteins.

SUMMARY OF THE PRESENT INVENTION

One object of the present invention is to provide a chromatographic-matrix, which when derivatised into an ion-exchanger exhibits a higher capacity, especially protein capacity, as compared to the prior art. This can be achieved by providing a surface-modified base matrix, which is comprised of a porous polymeric base matrix onto which a hyperbranched hydrophilic polyhydroxy-functional polymer has been covalently attached.

Another object of the invention is to provide a matrix as described above, which also exhibits satisfactory properties as regards chemical stability and robustness.

A further object of the invention is to provide a matrix, which when derivatised into an ion-exchanger exhibits a broader applicability than prior art matrices.

Yet another object of the invention is to provide a matrix as discussed above, which exhibits good chromatographic performance for several classes of proteins.

Further embodiments and advantages of the present invention will become apparent from the detailed description and examples that follow.

DEFINITIONS

Figure 1:
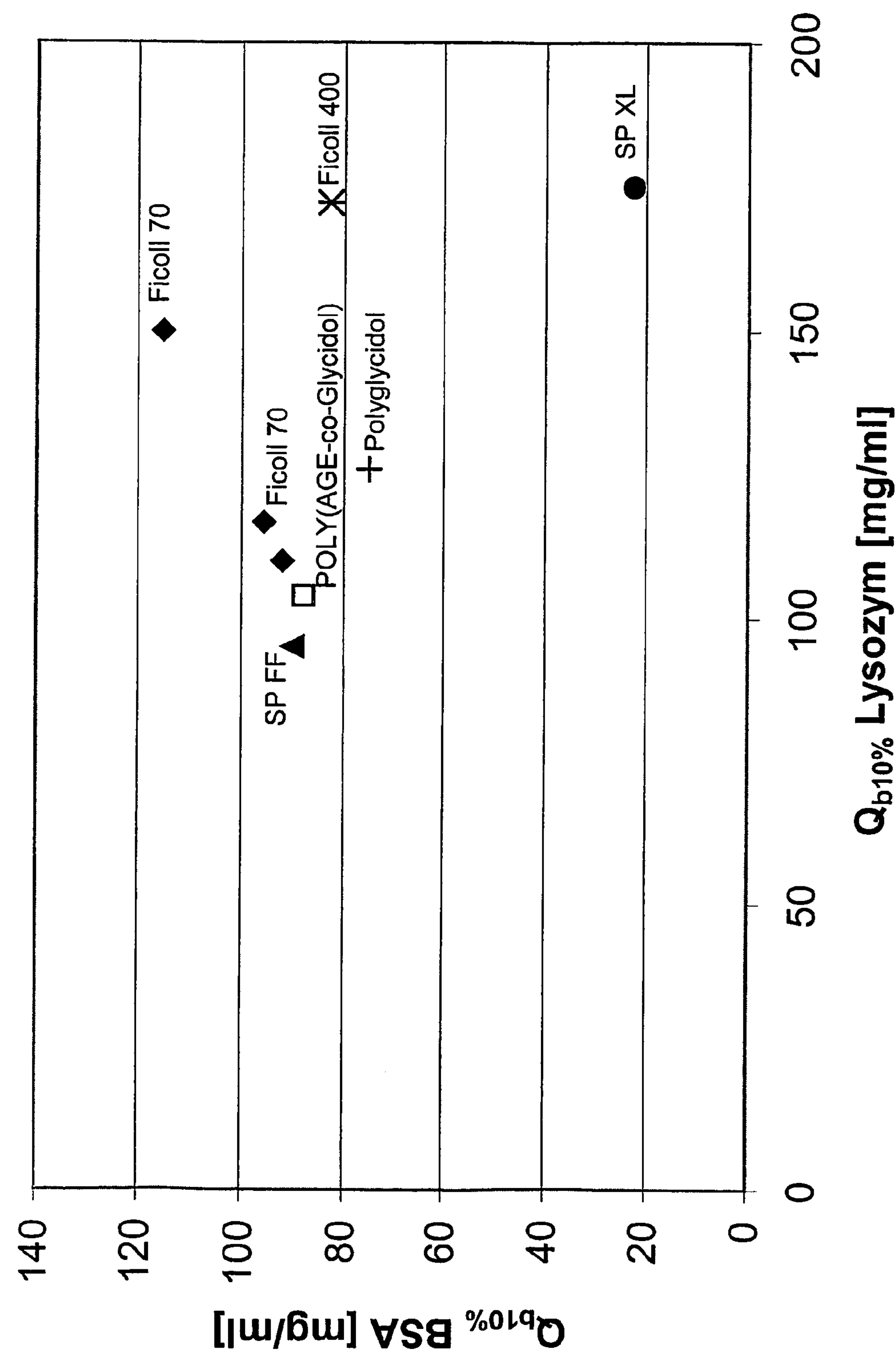
FIG. 1 shows the dynamic binding capacity for lysozyme as test protein plotted versus the dynamic binding capacity for BSA as test protein for the polymer modified prototypes.

In the present specification, the term "hyperbranched" compound means that exhibits a tree-like structure (i.e. the branches are further divided into sub-branches, which in their turn are branched etc.) The degree of branching (DB) can be defined as DB=nD/(nD+L), where D is the number of branch-point monomer units, n is the average number of branches extending from each branch-point and L is the number of linear (non-branching) monomer units.

The term "hydrophilic" means herein a water-soluble or water-swellable material, which does not give hydrophobic interactions with proteins. A test for the hydrophilicity of porous non-charged media can be to adsorb a model protein (e g ferritin) in a buffer containing a high concentration of ammonium sulfate and then elute it with a gradient of diminishing ammonium sulfate concentration. The higher the hydrophilicity of the media, the faster will the protein elute.

The term "polyhydroxy-functional" compound means herein a compound that presents two or more OH groups available for chemical reactions.

The term "base matrix" means herein a carrier as conventionally used in chromatographic methods. Accordingly, the term includes particles, such as spherical particles, monoliths, and membranes.

The "surface" of a porous base matrix as used herein is understood to include both the external surface of the matrix and the pore surfaces.

The term "covalently attached" means that a bond is formed due to sharing of electrons between atoms with only small differences in electronegativities. The following atoms, given in an order of decreasing electronegativity, are known to form covalent bonds with one another: F>O>N>Cl>Br>C>S>I>H. Important for the present context is that covalent bonds are strong and not easily dissociated, with bond dissociation energies typically in the range of 150-1000 kJ/mole.

The term "grafted" to a surface means herein that a polymer molecule has been attached to the surface via covalent bonds.

DETAILED DESCRIPTION OF THE INVENTION

One aspect of the present invention is surface-modified base matrix, which is comprised of a porous polymeric base matrix onto which branched hydrophilic polyhydroxy-functional polymers have been covalently attached, characterised in that the polyhydroxy-functional polymers are hyperbranched polymers that present a degree of branching (DB) of at least about 0.2 and that each polymer has been tethered to the base matrix at two or more points. The polymers are attached not only to the external surface of the matrix, but also on the pore surfaces. Furthermore, by definition, the nature of the polyhydroxy-functional polymers is totally hydrophilic and consequently different from the flat coating described in the above-discussed U.S. Pat. No. 5,030,352.

The tethering of the polymers according to the invention at two or more contact points on the surface is a feature that has not been suggested or utilised before with this kind of polymers. Hence a novel kind of fluff-like coating, which is more extensive since it is more branched than prior art coatings, is provided by the present invention.

In addition, ion exchangers made by conventional derivatisation of base matrices surface-modified according to the invention using the above-defined hyperbranched polymers have by the present inventors been shown to result in unexpectedly high binding capacities when used in chromatography, as will be shown in the Experimental part below. The high binding capacity discussed above was also unexpected in view of the above-discussed U.S. Pat. No. 5,906,747, wherein it is speculated that if a "free" or unconfined coating was applied to a porous support matrix, then a reduced binding capacity would result due to a swelling and a dilution of binding sites.

Another advantage of the surface-modified ion-exchange matrix according to the invention is that the hyperbranched hydrophilic polymer is essentially inert when coupled to the surface, as compared e.g. to the above-discussed U.S. Pat. No. 5,030,352, wherein a coating was merely adsorbed to a hydrophobic surface. More specifically, this means that there will be few or no interactions that pulls the coating down toward the matrix surface, or makes it flatter than desired.

In one embodiment, the polymeric base matrix is comprised of a cross-linked carbohydrate material, such as agarose, agar, cellulose, dextran, chitosan, konjac, carrageenan, gellan, alginate etc. In a specific embodiment, the base matrix is comprised of a cross-linked polysaccharide that has been modified to be suitable for use in expanded bed adsorption (EBA), such as the commercially available particles Streamline™ (Amersham Biosciences AB, Uppsala, Sweden).

The base matrices that are surface-modified according to the invention can easily be prepared according to standard methods, such as inverse suspension gelation (S Hjertén: Biochim Biophys Acta 79 (2), 393-398 (1964). Alternatively, the base matrices are commercially available products, such as Sepharose™ FF (Amersham Biosciences AB, Uppsala, Sweden).

In another embodiment, the base matrix is comprised of cross-linked synthetic polymers, such as styrene or styrene derivatives, divinylbenzene, acrylamides, acrylate esters, methacrylate esters, vinyl esters, vinyl amides etc etc. Such polymers are easily produced according to standard methods, see e.g. "Styrene based polymer supports developed by suspension polymerization" (R Arshady: Chimica e L'Industria 70 (9), 70-75 (1988)).

Alternatively, a commercially available product, such as Source™ (Amersham Biosciences AB, Upps ala, Sweden) can be surface-modified according to the invention.

Thus, in summary, the porous base matrix can in principle be of any material that allows the covalent coupling of the hyperbranched hydrophilic polyhydroxy-functional polymer, such as the above-discussed, ceramics or the like.

In one embodiment, the porous base matrix has hydrophilic pore surfaces. This is advantageous in order to avoid or at least reduce any non-specific protein interactions. It is also advantageous if the pore surfaces have a high density of hydroxyl groups available for grafting of the hyperbranched hydrophilic polymer. If the porous base matrix has undesirable surface properties it is possible to coat it with a hydrophilic polyhydroxy-functional material before grafting of the polymer.

In one embodiment, the porosity, i.e. the pore volume divided by the total volume of the porous material, of the base matrix is at least about 65%, preferably at least about 75%, more preferably at least about 80% and most preferably at least about 90%, such as about 94 or 96%.

In one embodiment of the present matrix, the degree of branching (DB) of the hyperbranched hydrophilic polymer is at least about 0.2, preferably at least about 0.4, more preferably at least about 0.6 and most preferably at least about 0.7. The degree of branching is a well-known term in the field of polymer chemistry, and can be determined according to an adaptation of the equation developed by Frey et al:

$$DB=nD/(nD+L)$$

wherein D=fraction of dendritic units (branching point monomer units)

L=fraction of linear units and n=average number of branches extending from each branching point.

Alternatively, the branched structure can be assessed from the dimensions of the polymer molecules. The branching parameter g is often defined as $g=\langle R^2\rangle_b/\langle R^2\rangle_L$ where R is the radius of gyration for the branched polymer (b) and a linear polymer of the same molecular weight (L). The radius of gyration can be determined by light scattering, e.g. by using the SEC-MALLS technique. As branching reduces the radius of gyration, a highly branched polymer will have a value of $g<1$.

In one embodiment, the molecular weight of the hyperbranched hydrophilic polymer is in the range of 10-2,000, preferably 20-1,000, more preferably 30-500 and most preferably 40-400, such as about 70 kD.

In one embodiment of the matrix according to the invention, the hyperbranched hydrophilic polymer is a copolymer comprised of a polyhydroxy-functional monomer cross-linked with an epoxide, such as epichlorohydrin, or a diepoxide. However, as the skilled person in this field will realise, virtually any well-known di- or polyfunctional electrophilic reagent can be used as long as it is capable of polymerising with the polyol used to a sufficient extent to provide the desired polymer. Copolymers of the present kind can e.g. be prepared as disclosed in U.S. Pat. No. 3,300,474 (Pharmacia). In brief, a method of producing a copolymer according to the invention includes to react sucrose, which is a disaccharide with eight hydroxyl groups, with epichlorohydrin in an alkaline aqueous environment. The sucrose acts as a branching monomer, with up to six side branches extending if all hydroxyl groups react. The epichlorohydrin can react either with hydroxyl groups from the sucrose or with hydroxyl groups formed from other epichlorohydrin molecules. In addition to the extensive branching, there is also a high probability of internal crosslink formation within the formed polymer molecules. The polymerisation conditions must be chosen so that only soluble polymer and no bulk crosslinked product is formed.

In this context, polyhydroxy-functional means that the compound comprises more than one hydroxy group which are pendant to a sufficient extent to be reactive. Accordingly, polymerisation of a polyhydroxy-functional monomer results in a hyperbranched hydrophilic polymer that presents a plurality of functional hydroxy groups and is hence denoted polyhydroxy-functional.

One group of compounds that comprises many hydroxyl groups is sugars and sugar derivatives, such as sugar alcohols. Accordingly, the polyhydroxy-functional monomer can be selected from the group that consists of monosaccharides, disaccharides and polysaccharides as well as any derivative thereof that contains two or more hydroxyl groups. Thus, in one embodiment, the polyhydroxy-functional monomer is a polyol, such as a sugar or a sugar alcohol. In a specific embodiment, the polyhydroxy-functional monomer is selected from the group that consists of sucrose, glucose, sorbitol, mannitol and xylitol. In an illustrative embodiment, the polyhydroxy-functional monomer is sucrose. In the experimental part below, examples will be presented wherein the copolymer is comprised of sucrose cross-linked with epichlorohydrin. Such a copolymer is commercially available and known as Ficoll™ (Amersham Biosciences AB, Uppsala, Sweden). This specific copolymer is highly branched and contains internal cross-links, giving the molecules a dense spherical shape. The diameter of the molecules in aqueous solution is approximately half the diameter of dextran molecules as derived from *Leuconostoc* mesenteroides B512-F (available as Dextran™ T fractions from Amersham Biosciences) of corresponding molecular weight.

Poly(epoxide)s can according to literature be produced both through anionic and cationic ring opening polymerisation of epoxides. In this context, it is noted that most epoxides are also known by other names such as oxiranes.

Hyperbranched polymers can be produced from a diverse group of epoxide monomers such as glycidol, epichlorohydrin etc. The illustrating glycidol monomer provides a site for hydrogen exchange between the growing end and the hydroxyl group pendant to the oxirane ring. The exchange reaction initiates branching and the resulting polymer will under certain experimental conditions be hyperbranched. Reaction conditions facilitating branching is for example slow monomer addition, low reaction temperature etc.

In the experimental part below, examples will be presented wherein the hydrophilic hyperbranched polymer is polyglycidol.

Copolymerisation of different epoxide monomers can be used as a tool to modulate the chemical and physical properties of the polymer formed. Copolymers can be prepared as random copolymers or block copolymers resulting in either linear, branched or hyperbranched structures.

Allyl glycidyl ether represents a linear comonomer possessing an additional functional unit, an ally group. The production of copolymers between glycidol and allyl glycidyl ether results in a hydrophilic hyperbranched structure functionalised with allyl groups. The glycidol monomer acts as the branching unit while the comonomer allyl glycidyl ether provides a group for attachment of functional groups such as ionic groups or affinity ligands etc. The polymer formed is a polyhydroxy functional macromolecule. In the experimental part below, examples will be presented wherein the hydrophilic hyperbranched copolymer is poly(allyl glycidyl ether-co-glycidol).

The base matrix according to the invention is readily derivatised into a functionalised matrix useful in any chromatographic method. Accordingly the present matrix can be used to isolate any kind of target substance, for example biomolecules, such as proteins, nucleic acids, such as DNA, e.g. in the form of plasmids, and RNA, virus, small organic molecules, such as drug candidates, carbohydrates etc. Thus, in one embodiment, the present matrix has been derivatised into a chromatographic matrix by attachment of functional groups to one or more of the hydroxy groups of the polymer. In this context, it is to be understood that "functional" means that the groups are capable of interacting with target substances in a chromatographic method, preferably via adsorption thereof.

Thus, in one embodiment, the matrix according to the invention has been derivatised into an ion-exchanger by attachment of charged groups, which are capable of binding substances of the opposite charge, to one or more of the hydroxy groups of the polymer.

Methods of preparing ion-exchangers are well known in the field of chromatography, and the skilled person in this field can easily select appropriate conditions and/or materials for providing such charged ion-exchange ligands on the surface-modified matrix.

In one embodiment, the present matrix has been derivatised into a cation-exchanger by attachment of sulfopropyl groups, known as SP groups, to one or more of the hydroxy groups of the polymer. However, other negatively charged groups can alternatively or additionally be attached, such as sulfonate, sulfate, carboxylate, phosphonate or phosphate groups.

In another embodiment, the present matrix has been derivatised into an anion-exchanger by attachment of quaternary amino groups, known as Q groups, to one or more of the hydroxy groups of the polymer. However, other positively charged groups can alternatively or additionally be attached, such as amines, sulfonium or phosphonium groups.

In another embodiment, the functional groups mentioned above are affinity groups, groups capable of hydrophobic interaction with a target substances, metal chelating groups or the like. Accordingly, the hydroxy groups present on the surface-modified matrix according to the invention can be used as handles to attach any desired functional groups in accordance with well-known methods.

Accordingly, one aspect of the invention is the use of a surface-modified chromatographic base matrix, which is comprised of a porous polymeric base matrix onto which polyhydroxy-functional polymers that present a degree of branching of at least about 0.2, preferably at least about 0.4, more preferably at least about 0.6 and most preferably at least about 0.7, in a chromatographic separation method, in which matrix each polymer has been tethered to the base matrix at two or more points. Details as regards the matrix and the methods are as described above and elsewhere in the present application.

As is well known in the field of chromatography, many factors may influence the binding capacity obtained. Such factors are e.g. the amount of grafted polymer and the porosity and the pore size of the base matrix. As regards proteins, it is often observed that different classes of proteins are more advantageously used under certain conditions. In this context, proteins can be grouped into classes such as immunoglobulines, enzymes, high molecular weight proteins and low molecular weight proteins etc.

One factor that has been observed to be of importance if the present base matrix is derivatised into an ion exchanger is the ionic capacity of the ion-exchanger. Thus, in one embodiment, the ionic capacity of the derivatised surface-modified matrix is about 100-200, such as about 150 μmole/ml matrix (as gel), as determined by titration. The ionic capacity of ion-exchangers will also be discussed in the Experimental part below. However, as the skilled person in this field will realise, the choice of the most suitable hyperbranched hydrophilic polymer as well as the other factors mentioned above can in each case be based on routine testing.

A second aspect of the present invention is the use of a hyperbranched hydroxy-functional hydrophilic polymer for surface-modification of a chromatographic base matrix, which polymer exhibits a degree of branching of at least about 0.2, such as at least about 0.4 and preferably at least about 0.6. In other embodiments, the hyperbranched hydrophilic polymer used according to the invention is as discussed above.

A third aspect of the present invention is a method of surface-modification of a porous base matrix, which comprises the steps of (a) providing a porous base matrix that comprises functional hydroxy groups;

(b) activating the functional hydroxy groups on the base matrix by nucleophilic substitution;

(c) providing a hydrophilic hyperbranched hydroxy-functional polymer; and (d) contacting the activated base matrix with said polymer under conditions allowing covalent coupling of the hydrophilic polymer to the base matrix, wherein the polyhydroxy-functional polymer is a hyperbranched polymer that presents a degree of branching (DB) of at least 0.2. In a specific embodiment, the degree of branching is at least about 0.4 and in a preferred embodiment, it is at least about 0.6, such as at least about 0.7. As the skilled person in this field will realise, reaction conditions that facilitates branching is for example slow monomer addition, low reaction temperature etc. In a preferred embodiment, the base matrix obtained will present polymer tethered to the matrix surface at two or more contact points.

In one embodiment, the porous base matrix provided in step (a) is a cross-linked carbohydrate, such as agarose. In a specific embodiment, the porosity of the base matrix provided in step (a) is at least about 90%, such as at least about 94%. Porous base matrices useful in the present method can be obtained as described above in relation to the first aspect of the invention.

In an advantageous embodiment of the present method, an epoxide reagent is added in step (b). In alternative embodiments, step (b) is performed by adding any other electrophilic activation reagent, such as allyl bromide, cyanogen bromide, cyanuric chloride, divinylsulfone, tosyl chloride, tresyl chloride etc, in accordance with well known methods.

In one embodiment of the present method, the hydrophilic hyperbranched hydroxy-functional polymer is provided by polymerisation of a polyhydroxy-functional monomer with epichlorohydrin. In one embodiment, the polyhydroxy-functional monomer is a sugar or sugar alcohol. In a specific embodiment, the polyhydroxy-functional monomer is selected from the group that consists of sucrose, glucose and sorbitol, preferably sucrose. Thus, the present copolymer can either be obtained by chemical synthesis following well-known methods or it is obtained as a commercial product. An illustrative example of such a commercially available product is the above-mentioned Ficoll.

In one embodiment, (d) of the present method is performed under alkaline conditions.

A further aspect of the present invention is a method of producing an ion-exchange matrix, which method comprises to modify the surface of a porous base matrix as described above and an additional step of derivatisation of one or more of the hydroxy groups present on the modified surface with charged groups that are capable of binding substances of the opposite charge. Preparation of ion-exchangers from a base matrix is easily done according to well-known methods and was also discussed above.

A last aspect of the present invention is a base matrix, which has been surface-modified as described above, and an ion-exchanger that has been produced as described above.

DETAILED DESCRIPTION OF THE DRAWINGS

FIG. 1 shows the dynamic binding capacity for lysozyme as test protein plotted versus the dynamic binding capacity for BSA as test protein for the polymer modified prototypes. Prototypes are named according to the type of surface modification, ic=ionic capacity. (See examples 1-6.) The dynamic binding capacities were tested in HR 5/10 columns at pH 4.75 an at a flow rate of 300 cm/h.

Figure 2:
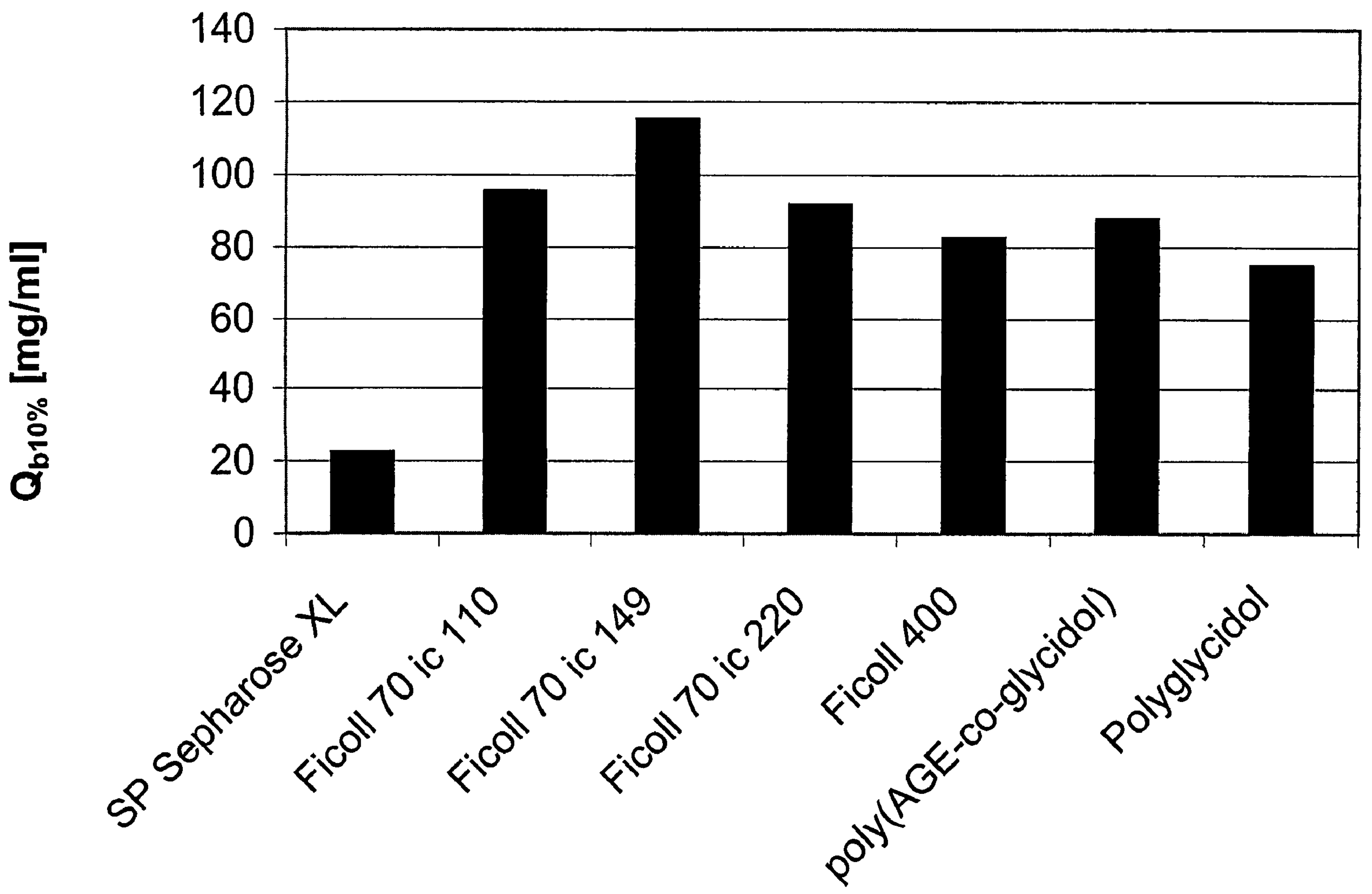
FIG. 2 illustrates the dynamic binding capacity plotted for the polymer modified prototypes with BSA as test protein.

Symbols: ▲: SP Sepharose FF; ●: SP Sepharose XL; ♦: Ficoll 70; ★: Ficoll 400; : poly(AGE-co-glycidol); +: polyglycidol FIG. 2 illustrates the dynamic binding capacity plotted for the polymer modified prototypes with BSA as test protein compared to a commercially available SP Sepharose XL, which is coated with dextran derived from *L. mesenteroides* B512-F. (See eamples 1-6.) The dynamic binding capacities were tested in HR 5/10 columns at pH 4.75 an at a flow rate of 300 cm/h.

Figure 3:
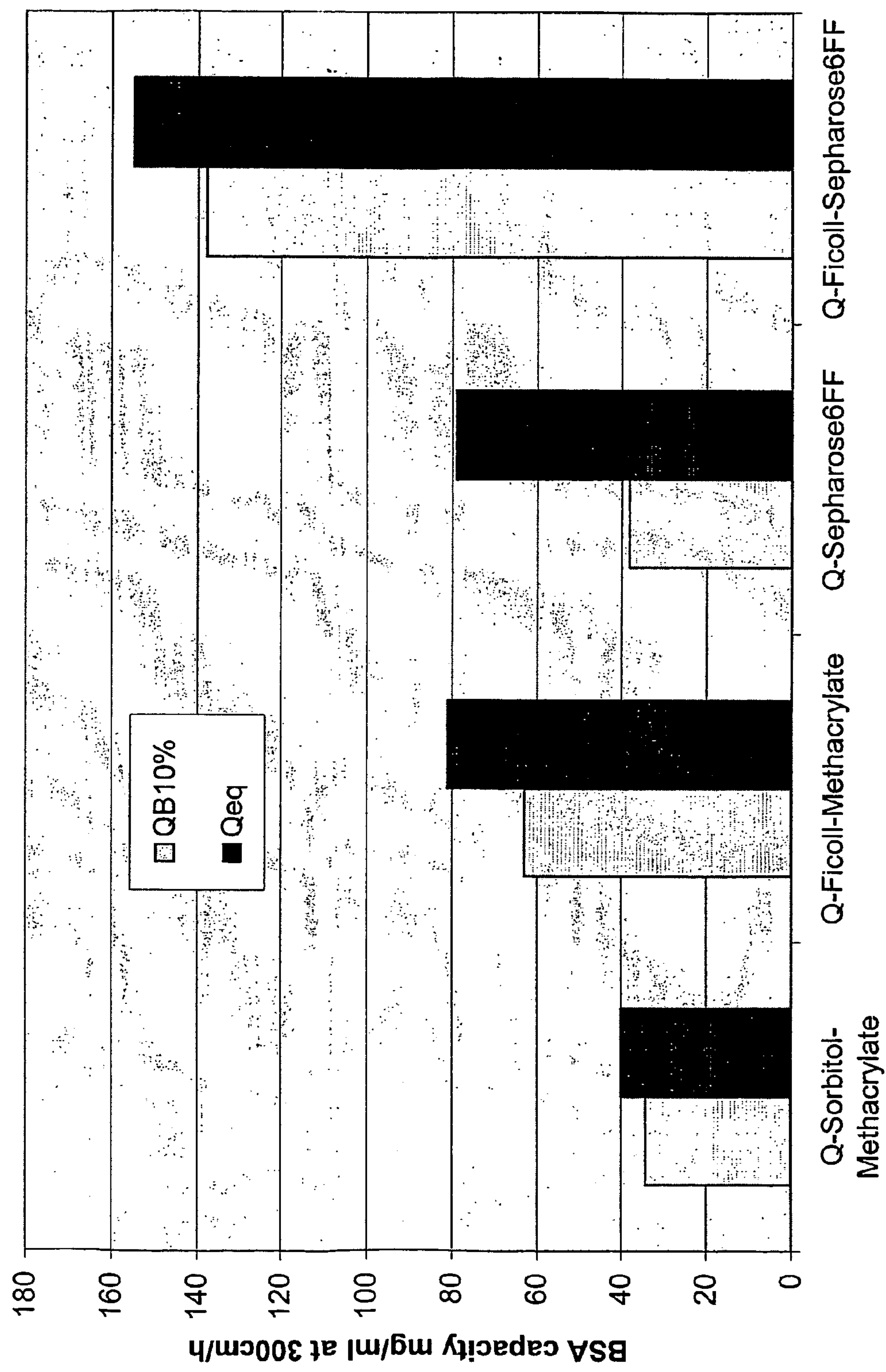

FIG. 3 shows Q-ion exchangers evaluated with frontal analysis of bovine serum albumine in HR10/10 columns at a flow rate of 300 cm/h. The capacity is determined at 10% breakthrough (Qb10%) and at equlibrium (Qeq). The polymer modified prototypes are compared with the corresponding non-modified prototype; Q-Sorbitol-Methacrylate vs. Q-Ficoll-Methacrylate and Q-Sepharose 6FF vs. Q-Ficoll-sepharose 6FF (example 8 and 10).

Figure 4:
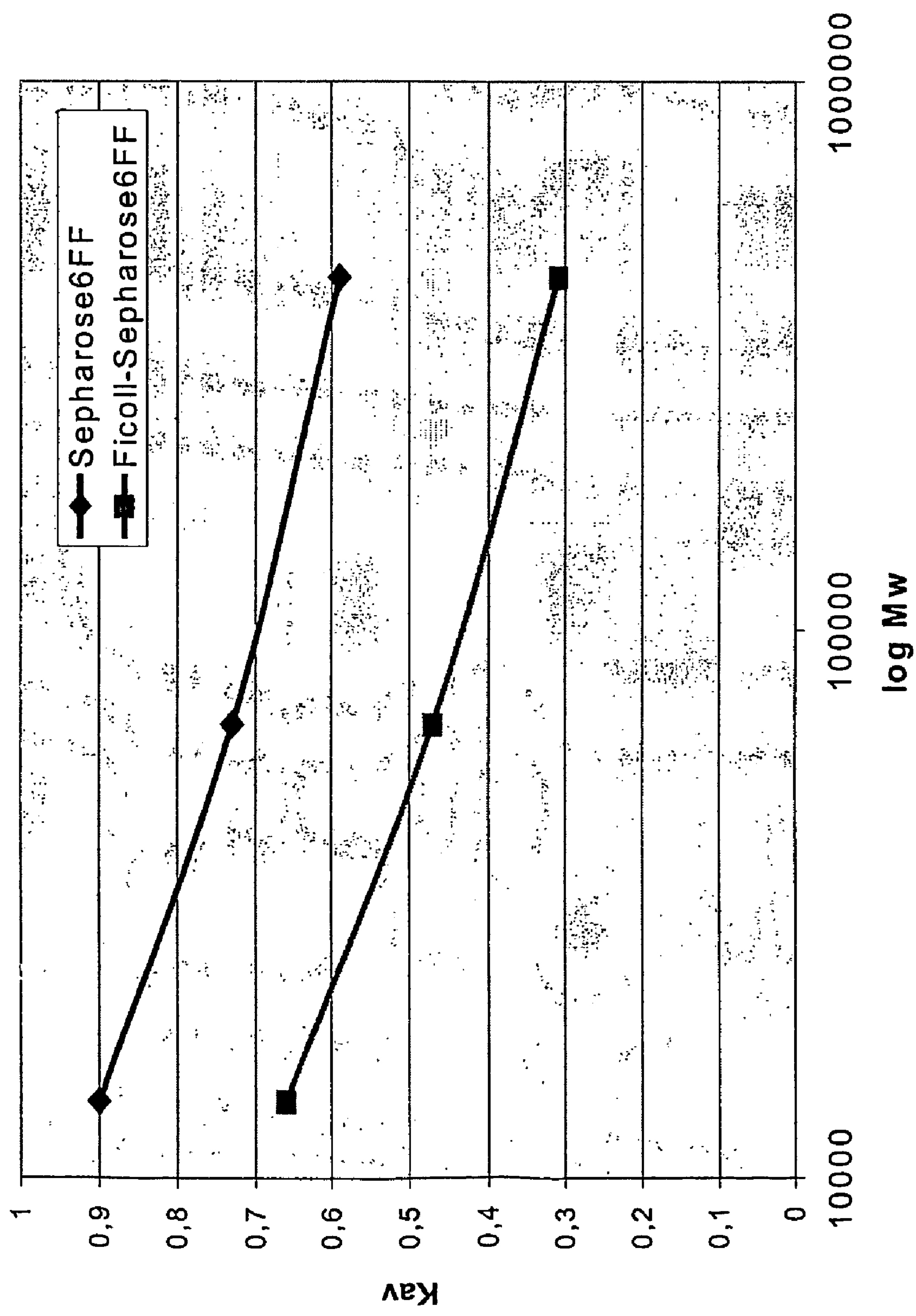

FIG. 4 illustrates Ficoll-Sepharose 6FF compared to Sepharose 6FF regarding size exclusion properties. The selectivity is changed when the matrix is modified with a polymer.

Size exclusion chromatography was run in HR 10/10 columns with three different proteins (example 7).

Figure 5:
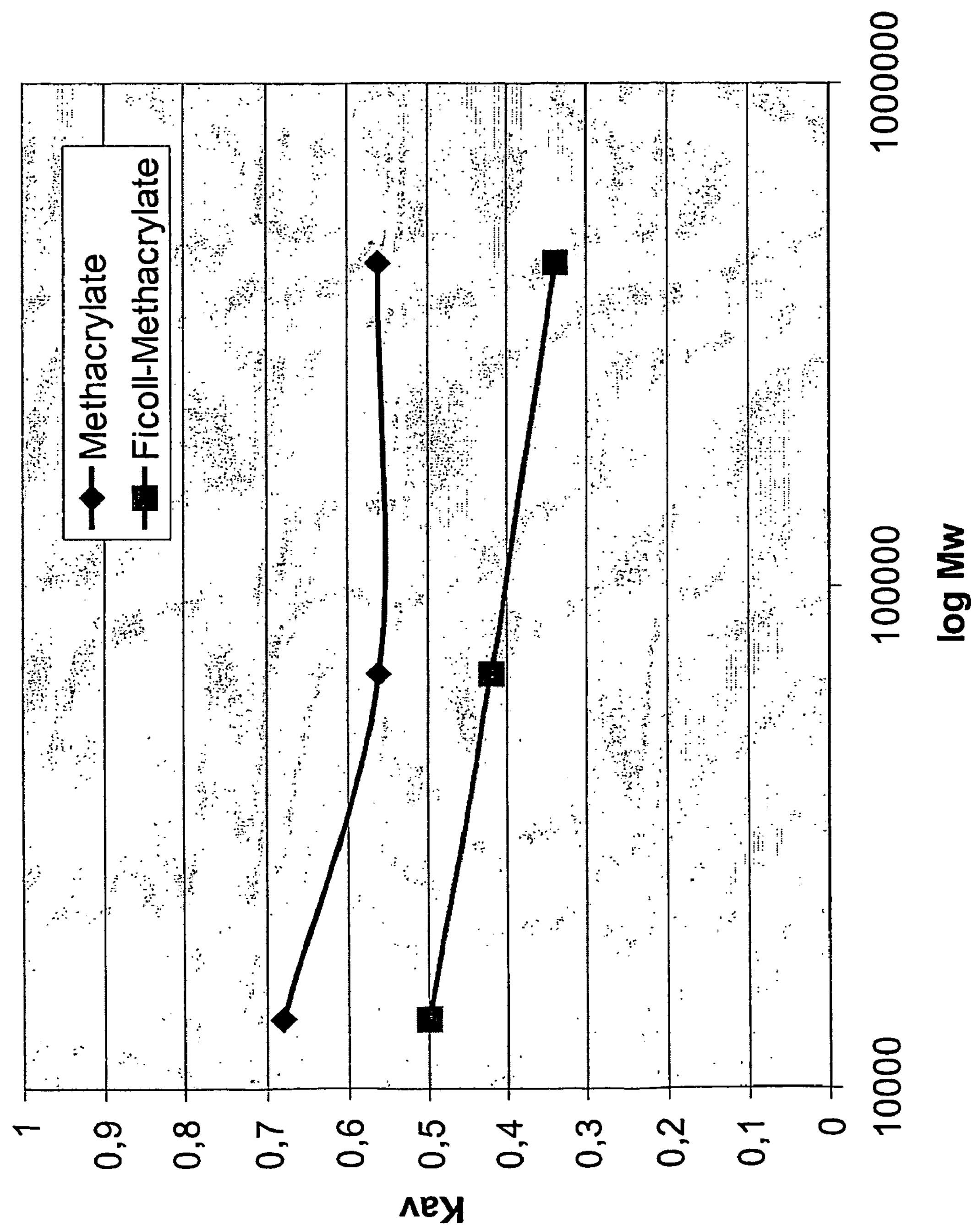

FIG. 5 illustrates Ficoll-Methacrylate compared to Methacrylate regarding size exclusion properties. The selectivity is changed when the matrix is modified with a polymer. Size exclusion chromatography was run in HR 10/10 columns with three different proteins (example 9).

EXPERIMENTAL PART

Below, the present invention will be illustrated by way of examples, which are in no way intended to limit the invention as defined in the appended claims. All references given below or elsewhere in the present specification are hereby included herein by reference.

EXAMPLE 1

Synthesis of Polyglycidol

In a representative example a reaction vessel and a vial provided with a magnetic stirring bar were dried at 110° C. while the Hamilton syringes were dried at 65° C. over night. Tubes, membranes and syringe needles were dried over night in a dessicator filled with silica gel. The hot equipment was allowed to cool down in a dessicator before use. The initiator potassium-tert-butoxide (Aldrich) was weighed into the reaction vessel (M/I=100), whereupon the vessel was membrane sealed and flushed with argon gas. The glycidol monomer (14.0 g) (Aldrich) was introduced into a separate vial by Hamilton syringes. The vial containing the monomer mixture was flushed with argon.

The reaction vessel was cooled on ice. The monomer was transferred from the vial to the reaction vessel by using a peristaltic pump P-1 (Amersham Biosciences AB, Uppsala, Sweden) (tube ID 1.0 mm). After 30 minutes of addition the temperature of the reaction vessel was increased to the polymerisation temperature. The monomer mixture in the vial was completely transferred to the reaction vessel after about 4 hours.

After complete reaction the polymer was dissolved in a small amount of methanol and the reaction was quenched by adding HCl. The poly(glycidol) was precipitated in acetone as a work-up procedure. The Mw was determined to 20500 g/mol and the DB was calculated to 50%.

Coupling of Polyglycidol to Sepharose 6 FF

Sepharose 6FF gel (40 g) (Amersham Biosciences AB, Uppsala, Sweden) was weighed into a round-bottom vessel and mixed with 30 ml of distilled water. NaOH (5 g) and $NaBH_4$ (0.07 g) was added whereupon the temperature was allowed to stabilise at 30° C. for 1 hour. Thereafter, epichlorohydrin (9 ml) (Shell Chemicals) was added and the reaction was allowed to proceed for 2 hours at 30° C. Acetic acid was used to neutralise and quench the reaction. The gel was washed on a glass filter with plenty of water. The number of epoxides in 1 ml of gel was determined to 25 μmol by titration.

Polyglycidol (12 g) was dissolved in distilled water (16 ml) whereupon the epoxide functionalized gel (33 g) was added. The mixture was stirred during 1 hour at 30° C. NaOH (50%) (1,7 ml) and $NaBH_4$ (0.02 g) was added and the reaction was allowed to proceed at 30° C. over night.

Acetic acid was used to neutralise the reaction mixture before the gel was washed on a glass filter with a large volume of deionized water. The content of polyglycidol was estimated by determining the dried weight of 1 ml gel before and after coupling the polymer. The amount of coupled polymer was determined to approximately 6 mg/ml gel.

Introduction of Cation Exchanging Groups (Sulfopropyl Groups)

The polyglycidol coupled Sepharose™ 6 FF (20 g) (Amersham Biosciences AB, Uppsala, Sweden) was mixed with distilled water (10 ml) in a reaction vessel. Sodium hydroxide (6 g), sodium borohydride (0.08 g) and sodium sulphate (3 g) was added to the gel slurry. The flask was heated to 50° C. with a thermostated water bath. After an hour when the salt was dissolved, allyl glycidyl ether (12 ml) (Inspec Fine Chemicals B.V.) was added. The reaction mixture was stirred over night at 50° C. The reaction was stopped by neutralisation with concentrated acetic acid and first washed with ethanol and then with distilled water. This procedure gave an allyl content of 217 μmol/ml gel.

The allyl functional gel (16 g), distilled water (25 ml) and $Na_2S_2O_3$ (14 g) were weighed into a round-bottom vessel. NaOH 50% was used to adjust pH to approximately 6.5. A constant flow of air was dispersed through the reaction mixture. The reaction was left with stirring at room temperature over night. After reaction the gel was washed on glass filter with plenty of distilled water. The ionic capacity of 1 ml gel was determined by titration to 228 μmol/ml gel.

EXAMPLE 2

Synthesis of Poly(allyl glycidyl ether-co-glycidol)

In a representative example a reaction vessel and a vial provided with a magnetic stirring bar were dried at 110° C. while the Hamilton syringes were dried at 65° C. over night. Tubes, membranes and syringe needles were dried over night in a dessicator filled with silica gel. The hot equipment was allowed to cool down in a dessicator before use. The initiator potassium-tert-butoxide (Aldrich) was weighed into the reaction vessel (M/I=105), whereupon the vessel was membrane sealed and flushed with argon gas. The monomers, allyl glycidyl ether (11.4 g) (Inspec Fine Chemicals B.V.) and glycidol (7.6 g) (Aldrich), were introduced into the vial by Hamilton syringes. The vial containing the monomer mixture was flushed with argon.

The reaction vessel was heated to 30° C. The monomer mixture was transferred from the vial to the reaction vessel by using a peristaltic pump P-1 from Amersham Biosciences AB, Uppsala, Sweden (tube ID 1.0 mm). After 30 minutes of addition the temperature of the reaction vessel was increased to the polymerization temperature. The monomer mixture in the vial was completely transferred to the reaction vessel after about 5 hours.

After complete reaction the polymer was dissolved in a small amount of methanol and the reaction was quenched by adding HCl. The copolymer was dried in a vacuum oven and used in the dried state without further purification. The Mw was determined to 13600 g/mol by SEC, the allyl glycidyl ether content was calculated from NMR to 34% and the DB was calculated to 41%.

Coupling of Poly(allyl glycidyl ether-co-glycidol) to Sepharose™ 4 FF

Sepharose™ 4FF (266 g) (Amersham Biosciences AB, Uppsala, Sweden) was weighed into a round-bottom vessel together with NaOH 50% (215 ml), $NaBH_4$ (1,4 g) and $Na_2SO_4$ (36 g). The salts were dissolved for 1 hour at 50° C. Allyl glycidyl ether (266 ml) (Inspec Fine Chemicals B.V.) was added and the reaction was allowed to proceed at 50° C. over night.

The reaction was quenched when neutralising the mixture with concentrated acetic acid. The allyl-Sepharose™ 4FF gel was washed on a glass filter with plenty of deionized water, followed by ethanol and then again deionized water.

The allyl content of the gel was determined by titration to 266 μmol/ml gel.

The Sepharose™ gel with allylic funtionality was washed on a glass filter with plenty of distilled water. The gel (65 g) and sodium acetate trihydrate (15 g) were weighed into a round-bottom vessel and mixed with 65 ml of distilled water. Bromine (3 ml) was introduced under mechanical stirring at room temperature and reaction was allowed for 10 minutes. The excess bromine was neutralised by adding sodium formate dissolved in a small amount of water. The neutralising reaction was allowed to proceed for 1 hour at room temperature. The gel was washed on glass filter with plenty of distilled water.

The poly(allyl glycidyl ether-co-glycidol) (15 g), NaOH (8 g) and $NaBH_4$ (0.12 g) were dissolved in water in a round-bottom beaker. The Sepharose™ gel (30 g) with bromine functionalization was added and the coupling reaction was allowed to proceed over night at 50° C. under mechanical stirring. Acetic acid was used to neutralise the reaction mixture before washing the gel with a large amount of ethanol followed by distilled water.

The amount of coupled polymer in 1 ml of gel was determined by titration of the number of allylic groups in the coupled polymer. The amount of coupled polymer was determined to 42 mg/ml gel.

Introduction of Cation Exchanging Groups (Sulfopropyl Groups)

Poly(allyl glycidyl ether-co-glycidol) coupled Sepharose™ 4 FF gel (25 g), distilled water (25 ml) and $Na_2S_2O_3$ (14 g) were weighed into a round-bottom vessel. NaOH 50% was used to adjust pH to approximately 6.5. A constant flow of air was dispersed through the reaction mixture. The reaction was left with stirring at room temperature over night. After reaction the gel was washed on glass filter with plenty of distilled water. The ionic capacity of the gel was determined by titration to 148 μmol/ml gel.

EXAMPLE 3

Coupling of Ficol™ 70 to Sepharose™4FF

Beads of Sepharose™ 4 FF (100 g) (Amersham Biosciences AB, Uppsala, Sweden), distilled water (50 ml), sodium hydroxide (NaOH) (12 g) and sodium borohydride (0.2 g) were mixed in a reaction vessel at 30° C. Thereafter epichlorohydrin (24 ml) (Shell Chemicals) was added. After two hours, acetic acid was added until neutralisation of the reaction mixture was obtained. The resulting gel (epoxFF) was washed with water. This procedure gave an expoxy-content of 16.1 μmol/ml gel.

Ficoll™ 70 (50 g) and distilled water (80 ml) were mixed in a beaker and stirred slowly until the polymer was completely dissolved. The epoxFF gel (100 g) was weighed into a round-bottomed flask and the polymer solution was added. After approximately 30 minutes the desired amount of 50%-sodium hydroxide (5,25 ml) and sodium borohydride (0.05 g) were added. The slurry was stirred over night at 50° C. The reaction was stopped by neutralising with concentrated acetic acid and then the gel was washed with distilled water on a glass filter.

Introduction of Cation Exchanging Groups (Sulfopropyl Groups)

Ficoll™ 70 coupled Sepharose™ 4 FF (100 g) and distilled water (50 ml) were mixed in a reaction vessel. Sodium hydroxide (30 g), sodium borohydride (0.4 g) and sodium sulphate (14 g) were added to the reaction vessel. The flask was heated to 50° C. with a thermostated water bath. After an hour when the salt was dissolved, allyl glycidyl ether (20 ml) (Inspec Fine Chemicals B.V.) was added. The reaction mixture was stirred over night at 50° C. The reaction was stopped by neutralisation with concentrated acetic acid and first washed with ethanol and then with distilled water on a glass filter. This procedure gave an allyl content of 134 μmol/ml gel.

The formed allyl functional product was mixed with distilled water (26 ml) and sodium metabisulphite (15 g) in a reaction vessel. The pH of the reaction mixture was adjusted to 6.5 with 50 weight-% sodium hydroxide solution. Extra air was supplied through a glass tube and bubbled into the reaction mixture. The mixture was stirred over night at 23° C. with a mechanical stirrer. The formed product was washed with water on a glass filter. This procedure gave an ionic capacity of 110 μmol/ml gel.

EXAMPLE 4

Ficoll™ 70 Coupling of Sepharose™ 4FF

The coupling of Ficoll™ 70 to Sepharose™ 4FF was performed as in Example 3.

Introduction of Cation Exchanging Groups (Sulfopropyl Groups)

The allyl functionalisation of Ficoll™ 70 modified Sepharose™ 4FF was performed according to example X but with a larger volume of allyl glycidyl ether (30 ml) (Inspec Fine Chemicals B.V.) added to the reaction mixture. This procedure gave an allyl content of 182 μmol/ml gel.

The derivatisation of the allyl groups to sulfopropyl groups was performed as in Example 3. This procedure gave an ionic capacity of 149 □mol/ml gel.

EXAMPLE 5

Ficoll™ 70 Coupling of Sepharose™ 4FF

The coupling of Ficoll™ 70 to Sepharose™ 4FF was performed as in Example 3.

Introduction of Cation Exchanging Groups (Sulfopropyl Groups)

The allyl functionalisation of Ficoll™ 70-modified Sepharose™ 4FF was performed according to Example 3 but with a larger volume of allyl glycidyl ether (60 ml) (Inspec Fine Chemicals B.V.) added to the reaction mixture. This procedure gave an allyl content of 310 μmol/ml gel.

The derivatisation of the allyl groups to sulfopropyl groups was performed as in Example 3. This procedure gave an ionic capacity of 220 μmol/ml gel.

EXAMPLE 6

Ficoll™ 400 Coupling of Sepharose™ 4FF

The coupling of Ficoll™ 400 to Sepharose™ 4FF was performed as in Example 3 but with Ficoll™ 400 instead of Ficoll™ 70.

Introduction of Cation Exchanging Groups (Sulfopropyl Groups)

The allyl functionalisation of Ficoll™ 400 modified Sepharose™ 4FF was performed as in Example 3. This procedure gave an allyl content of 145 μmol/ml gel.

The derivatisation of the allyl groups to sulfopropyl groups was performed as in Example 3. This procedure gave an ionic capacity of 139 μmol/ml gel.

EXAMPLE 7

Synthesis of Media for Size Exclusion Chromatography

Coupling of Ficoll™ 70 to Sepharose™ 6FF

Sepharose™ 6FF (Amersham Biosciences AB, Uppsala, Sweden) (200 g of water drained gel) was mixed with distilled water (120 ml), NaOH (26 g), and $NaHB_4$ (0.4 g) in a reaction vessel. The temperature was stabilised to 30° C. Epichlorohydrine (48 ml) was added and the mixture was stirred vigorously for 2 hours at 30° C. The reaction was stopped by neutralising with concentrated acetic acid and thereafter washed with water. This gave an epoxy content of ~35 μmol/ml gel.

Ficoll™ 70 (100 g) and distilled water (150 ml) were mixed in a beaker and stirred slowly until the polymer was completely dissolved. The solution was heated to 50° C. The epoxy funtionalised Sepharose™ 6FF gel (200 g) was weighed into a round-bottomed flask and the polymer solution was added. After approximately 30 minutes the desired amount of sodium hydroxide (33 g) and sodium borohydride (1.0 g) were added. The slurry was stirred over night at 50° C. The reaction was stopped by neutralising with concentrated acetic acid and then the gel was washed with distilled water on a glass filter. (Ficoll™70-Sepharose™ 6FF).

EXAMPLE 8

Synthesis of Anion Exchange Media

Coupling of Ficoll™ 70 to Sepharose™ 6FF

The coupling of Ficoll™ 70 to Sepharose™ 6FF was performed as in example 7. (Ficoll70-Sepharose6FF).

Introduction of Anion Exchanging Groups (Quaternary Amines)

Ficoll™ 70-Sepharose™ 6FF (50 g) was mixed with glycidyl trimethyl ammonium chloride (GMAC) (250 ml) in a 500 ml bottle for 30 minutes at 30° C. NaOH (50%) (7.5 ml) was added and the mixture was stirred at 30° C. for 6 hours. The reaction was stopped by neutralizing with concentrated HOAc and then washed with water on a glass filter. (Q-Ficoll70-Sepharose6FF).

This procedure gave a gel with an ionic capacity of 0.26 mmol/ml.

EXAMPLE 9

Synthesis of Media for Size Exclusion Chromatography

Coupling of Ficoll™ 70 to Methacrylate Beads

Macroporous beads were prepared from glycidyl methacrylate and glycerol-1,3-dimethacrylate according to standard methods well known in the field. The epoxy content is about 30-40 μmol/ml.

Ficoll™ 70 (20 g) and distilled water (30 ml) were mixed in a beaker and stirred slowly until the polymer was completely dissolved. The solution was heated to 50° C. The methacrylate gel (40 g) was weighed into a round-bottomed flask and the polymer solution was added. After approximately 30 minutes the desired amount of sodium hydroxide (6.6 g) and sodium borohydride (0.2 g) were added. The slurry was stirred over night at 50° C. The reaction was stopped by neutralising with concentrated acetic acid and then the gel was washed with distilled water on a glass filter. (Ficoll70-Methacrylate).

EXAMPLE 10

Synthesis of Anion Exchange Media

Coupling of Ficoll™ 70 to Methacrylate Beads

The coupling of Ficoll™ 70 to methacrylate beads was performed as in example 9. (Ficoll70-Methacrylate).

Coupling of Sorbitol to Methacrylate Beads

Macroporous beads were prepared from glycidyl methacrylate and glycerol-1,3-dimethacrylate according to standard methods well known in the field. The epoxy content is about 30-40 μmol/ml.

Sorbitol (300 g) and 0.2 M NaOH (300 ml) were mixed in a beaker and stirred slowly until the sorbitol was completely dissolved. The methacrylate gel (150 g) was weighed into a round-bottomed flask and the sorbitol/NaOH solution was added. The temperature was raised to 80° C. and the slurry was stirred over night. The reaction was stopped by neutralising with concentrated acetic acid and then the gel was washed with distilled water on a glass filter. (Sorbitol-Methacrylate).

Introduction of Anion Exchanging Groups (Quaternary Amines)

Ficoll™ 70-Methacrylate (40 g) was mixed with glycidyl trimethyl ammonium chloride (GMAC) (200 ml) in a 250 ml bottle for 30 minutes at 30° C. NaOH (50%) (6 ml) was added and the mixture was stirred at 30° C. for 6 hours. The reaction was stopped by neutralizing with concentrated HOAc and then washed with water on a glass filter. (Q-Ficoll70-Methacrylate).

This procedure gave a gel with an ionic capacity of 0.32 mmol/ml.

Sorbitol-Methacrylate (50 g) was mixed with distilled water (50 ml) and glycidyl trimethyl ammonium chloride (GMAC) (250 ml) in a 500 ml bottle for 30 minutes at 30° C. NaOH (50%) (5.4 g) and $NaBH_4$ (0.1 g) were added and the mixture was stirred at 30° C. for 18-20 hours. The reaction was stopped by neutralizing with concentrated HOAc and then washed with water on a glass filter. (Q-Sorbitol-Methacrylate) This procedure gave a gel with an ionic capacity of 0,14 mmol/ml.

EXAMPLE 11

Synthesis of Anion Exchange Media

Coupling of Polypropylenimine Tetramine to Sepharose™ 6FF

Sepharose™ 6FF (Amersham Biosciences AB, Uppsala, Sweden) (50 g of water drained gel) was mixed with distilled water (30 ml), NaOH (6.5 g), and NaHB4 (0.1 g) in a reaction vessel. The temperature was stabilised to 30° C. Epichlorohydrine (12 ml) was added and the mixture was stirred vigorously for 2 hours at 30° C. The reaction was stopped by neutralising with concentrated acetic acid and thereafter washed with water. This gave an epoxy content of ~44 μmol/ml gel.

Poly propylene imine tetramine $DAB(PA)_4$ (Aldrich 46, 069-9) (10 g) and distilled water (30 ml) were mixed in a beaker and stirred slowly until the polymer was completely dissolved. The solution was heated to 30° C. The epoxy funtionalised Sepharose™ 6FF gel (40 g) was weighed into a round-bottomed flask and the polymer solution was added. After approximately 30 minutes the desired amount of sodium hydroxide (6.6 g) and sodium borohydride (0.2 g) were added. The slurry was stirred over night at 30° C. The reaction was stopped by neutralising with concentrated acetic acid and then the gel was washed with distilled water on a glass filter. (DAB(PA)4—Sepharose™ 6FF). This procedure gave a gel with an ionic capacity of 0,15 mmol/ml and a breakthrough capacity (Qb10%) of Bovine Serum Albumine of 65 mg/ml (method according to example 14).

EXAMPLE 12

Synthesis of a Hyperbranched Polymer Based on Sorbitol and Epichlorohydrin

Sorbitol (10 g) was dissolved in distilled water (10 ml) and 45% NaOH (1 ml) was added. The mixture was heated to 50 C under stirring and epichlorohydrin (10 ml) (Shell Chemicals) and 45% NaOH (10 ml) were added in small portions during 2 h. After the last addition, the reaction mixture was stirred for an additional hour at 50 C. It was then poured into a beaker and ethanol (150 ml) was added under stirring to precipitate the formed polymer. The white sticky precipitate was separated and redissolved by addition of a small amount of water. The polymer was then precipitated again with ethanol, washed with ethanol and dried under vacuum. The recovery of dried material was 8.8 g.

EXAMPLE 13

Cation Exchange Chromatography

Breakthrough Capacity $Q_b$ for BSA at 300 cm/h, Packed Bed.

| Equipment: | |
|---|---|
| Column: | HR 5/10 (Amersham Biosciences AB, Sweden) |
| Buffer A: | 100 mM Na-Acetate, pH 4.75 |
| Buffer B: | 30 mM Na-phosphate, 1 M NaCl, pH 6.3 |
| Protein: | Bovine serum albumin, BSA, (Sigma) |
| Flow: | 300 cm/h |

Procedure:

The breakthrough capacity $Q_b$ was determined on a HR5/10 column at a linear flow rate of 300 cm/h. The protein was dissolved in buffer A, protein solutions were prepared with a concentration of 4 mg/ml.

Columns were equilibrated with 2 column volumes (CV) of 100 mM Na-Acetate, pH 4.75. Loading with protein solution continued until $A_{280}$ reached 50% of the maximum absorbance of the solution. Elution was done with elution buffer until the absorbance was 20% of the maximum absorbance. Then the column was cleaned with CIP for 60 minutes (30 CV). Finally the columns were reequilibrated with 100 mM Na-Acetate, pH 4.75 until the conductivity was less than 5 mS/cm. Evaluation of the breakthrough curves was done to determine the $Q_{B10}$% values.

Breakthrough Capacity $Q_b$ for Lysozyme at 300 cm/h, Packed Bed.

| Equipment: | |
|---|---|
| Column: | HR 5/10 (Amersham Biosciences AB, Sweden) |
| Buffer A: | 100 mM Na-Acetate, pH 4.75 |
| Buffer B: | 30 mM Na-phosphate, 1 M NaCl, pH 6.3 |
| Protein: | Lysozyme (Chicken Egg White) (USB) |
| Flow: | 300 cm/h |

Procedure:

Analogous to the procedure for BSA.

EXAMPLE 14

Anion Exchange Chromatography

The Q-ion exchangers were characterised by frontal analysis performed on a ÄKTA™ system (Amersham Biosciences AB, Uppsala, Sweden). The prototypes were evaluated with Bovine Serum Albumin at a flow rate of 300 cm/h. The gels were packed in HR 10/10 columns (Amersham Biosciences AB, Uppsala, Sweden). The equilibrium capacity ($Q_{eq}$) and breakthrough capacity at 10% ($Q_{b,\ 10}$%) were determined. The polymer modified gels were compared with the non-modified matrices.

| Protein and buffers for frontal analysis: BSA | |
|---|---|
| Protein: | BSA |
| Loading buffer: | 50 mM Tris pH 8.0 |
| Elution buffer: | 50 mM Tris pH 8.0, 1M NaCl |
| CIP-solution: | 1.0 M NaCl + 0.5 M NaOH |

EXAMPLE 15

Size Exclusion Chromatography

The polymer modified base matrices were characterised by gelfiltration in order to see how it affects the porosity and thereby the size exclusion properties. A comparision was made to the non-modified matrices.

The system used was a FPLC (Amersham Biosciences AB, Uppsala, Sweden) and the type of column used was a HR 10/10 (Amersham Biosciences AB, Uppsala, Sweden). Of approx. 7 g of drained gel a slurry was made with water and poured in the column which had a stopper at the bottom adaptor. The gel was allowed to self-sediment and then finally packed at a flow rate of 10 ml/min.

| Method for size exclusion chromatography: | |
|---|---|
| Flow rate: | 0.2 ml/min |
| Printer speed: | 0.2 cm/min |
| Buffer: | 0.05 M Na-Phosphate + 0.15 M NaCl; pH 7.0 |
| Sample: | Ferritin 1.25 mg/ml |
| | BSA 5 mg/ml |
| | R-nase 5 mg/ml |
| Void: | Blue Dextran |
| Sample volume: | 50 μl |

$K_{av}$ were calculated for the proteins and plotted vs. log molecular weight.

What is claimed is:

1. A surface-modified base matrix, comprising a porous polymeric base matrix onto which branched hydrophilic polyhydroxy-functional polymers have been covalently attached, wherein the branched polyhydroxy-functional polymers have a degree of branching (DB) of at least 0.2 and further wherein each branched polyhydroxy-functional polymer has been attached covalently to the base matrix at two or more points.

2. The matrix of claim 1, wherein the polymeric base matrix present a hydrophilic polyhydroxy-functional pore surface.

3. The matrix of claim 1, wherein the polymeric base matrix includes a cross-linked carbohydrate material.

4. The matrix of claim 1, wherein the polymeric base matrix is comprised of one or more synthetic polymers.

5. The matrix of claim 1, wherein the degree of branching of the branched polyhydroxy-functional polymers is at least about 0.4.

6. The matrix of claim 1, wherein the branched hydrophilic polymer is a copolymer comprising a polyhydroxy-functional monomer cross-linked with an epoxide.

7. The matrix of claim 6, wherein the epoxide is epichlorohydrin.

8. The matrix of claim 6, wherein the polyhydroxy-functional monomer is a polyol.

9. The matrix of claim 8, wherein the polyol is a sugar or a sugar alcohol.

10. The matrix of claim 9, wherein the polyhydroxy-functional monomer is selected from the group consisting of sucrose, glucose, sorbitol, mannitol and xylitol.

11. The matrix of claim 10, wherein the polyhydroxy-functional monomer is sucrose.

12. The matrix of claim 1, which has been derivatised into a chromatographic matrix by attachment of functional groups to one or more of the hydroxy groups of the branched polyhydroxy-functional polymer.

13. The matrix of claim 12, which is an ion-exchanger, and wherein said functional groups are charged groups adapted to binding substances having an opposite charge.

14. The matrix of claim 13, which has been derivatised into a cation-exchanger by attachment of sulfopropyl groups to one or more of the hydroxy groups of the branched polyhydroxy-functional polymer.

15. The matrix of claim 13, which has been derivatised into an anion-exchanger by attachment of quatemary amino groups to one or more of the hydroxy groups of the branched polyhydroxy-functional polymer.

16. The matrix of claim 12, wherein said functional groups are selected from the group consisting of affinity groups, hydrophobic groups and metal chelating groups.

* * * * *